(12) United States Patent
Brawer et al.

(10) Patent No.: US 10,133,737 B2
(45) Date of Patent: Nov. 20, 2018

(54) CONVERSION OF INPUT TEXT STRINGS

(75) Inventors: Sascha B Brawer, Berne (CH); Martin Jansche, New York, NY (US); Richard Sproat, Portland, OR (US); Hiroshi Takenaka, Chiba (JP); Yui Terashima, Tokyo (JP)

(73) Assignee: GOOGLE LLC, Mountain View, CA (US)

( * ) Notice: Subject to any disclaimer, the term of this patent is extended or adjusted under 35 U.S.C. 154(b) by 128 days.

(21) Appl. No.: 13/818,869

(22) PCT Filed: Aug. 26, 2011

(86) PCT No.: PCT/US2011/049352
§ 371 (c)(1),
(2), (4) Date: Jun. 7, 2013

(87) PCT Pub. No.: WO2012/027672
PCT Pub. Date: Mar. 1, 2012

(65) Prior Publication Data
US 2014/0163952 A1     Jun. 12, 2014

Related U.S. Application Data

(60) Provisional application No. 61/377,440, filed on Aug. 26, 2010.

(51) Int. Cl.
*G06F 17/28* (2006.01)
*G06F 17/22* (2006.01)

(52) U.S. Cl.
CPC ...... *G06F 17/2809* (2013.01); *G06F 17/2223* (2013.01); *G06F 17/2872* (2013.01); *G06F 17/28* (2013.01); *G06F 17/289* (2013.01)

(58) Field of Classification Search
CPC .............................. G06F 17/28; G06F 17/289
(Continued)

(56) References Cited

U.S. PATENT DOCUMENTS 5,991,721 A    11/1999  Asano et al.
7,711,547 B2   5/2010   Abir
(Continued)

FOREIGN PATENT DOCUMENTS

JP    05061902       12/1993
JP    08-328585 A    12/1996
(Continued)

OTHER PUBLICATIONS

ISR/WO for PCT App. No. PCT/US2011/049352, mailed on Jan. 24, 2012. (pp. 1-6).
(Continued)

*Primary Examiner* — Forrest F Tzeng
(74) *Attorney, Agent, or Firm* — Marshall, Gerstein & Borun LLP

(57) ABSTRACT

Methods, systems, and apparatus, including computer programs encoded on a computer storage medium, for transforming text strings. In general, one aspect of the subject matter described in this specification can be embodied in methods that include the actions of receiving input string having a plurality of terms, the input string being in a first form; transforming the input string from the first form to a second form including: applying one or more rules to the input string to identify one or more terms for translation, the one or more identified terms being fewer than the plurality of terms, translating the identified one or more terms to one or more translated terms in the second form, and transliterating the remaining terms of the plurality of terms into transliterated terms in the second form; and concatenating the translated and transliterated terms to form a hybrid output string in the second form.

22 Claims, 3 Drawing Sheets

(58) Field of Classification Search
USPC .......................................................... 704/2, 9
See application file for complete search history.

(56) References Cited

U.S. PATENT DOCUMENTS

| | | | | |
|---|---|---|---|---|
| 9,519,643 | B1* | 12/2016 | Nakagiri | G06F 17/2223 |
| 2003/0191626 | A1* | 10/2003 | Al-Onaizan | G06F 17/2223 |
| | | | | 704/8 |
| 2003/0225725 | A1* | 12/2003 | Miller | G06F 17/30241 |
| 2007/0050183 | A1* | 3/2007 | Kao | G01C 21/3626 |
| | | | | 704/3 |
| 2008/0097741 | A1* | 4/2008 | Bagnato | G06F 17/289 |
| | | | | 704/2 |
| 2008/0215309 | A1* | 9/2008 | Weischedel | G06F 17/2229 |
| | | | | 704/3 |
| 2008/0294455 | A1 | 11/2008 | Bharara | |
| 2009/0083023 | A1* | 3/2009 | Foster | G06F 17/2827 |
| | | | | 704/3 |
| 2009/0144049 | A1* | 6/2009 | Haddad | G06F 17/2223 |
| | | | | 704/3 |
| 2009/0319257 | A1* | 12/2009 | Blume | G06F 17/278 |
| | | | | 704/7 |
| 2010/0082523 | A1* | 4/2010 | Lim | G06F 9/44505 |
| | | | | 706/60 |
| 2010/0088266 | A1* | 4/2010 | Trefler | G06N 5/025 |
| | | | | 706/48 |
| 2011/0137636 | A1* | 6/2011 | Srihari | G06F 17/2863 |
| | | | | 704/2 |
| 2013/0238310 | A1* | 9/2013 | Viswanathan | G06F 17/277 |
| | | | | 704/2 |
| 2016/0364384 | A1* | 12/2016 | Nakagiri | G06F 17/2223 |

FOREIGN PATENT DOCUMENTS

| | | |
|---|---|---|
| JP | 10-312382 A | 11/1998 |
| JP | 2005-216127 A | 8/2005 |
| JP | 2005-529386 A | 9/2005 |
| KR | 2003-0078903 A | 10/2003 |

OTHER PUBLICATIONS

Office Action for Chinese Application No. 201180041432.1, dated Dec. 31, 2014.
Office Action for Chinese Application No. 201180041432.1, dated Nov. 13, 2015.
Office Action for Japanese Application No. 2013-526173, dated Jun. 1, 2015.
Office Action for Japanese Application No. 2013-526173, dated Mar. 7, 2016.
Office Action for Korean Application No. 10-2013-7007528, dated Jun. 21, 2017.
Decision of Rejection Issued in Japanese Application No. 2013-526173, dated Dec. 22, 2016.
Office Action for Korean Application No. 10-2013-7007528, dated Dec. 29, 2017.

* cited by examiner

CONVERSION OF INPUT TEXT STRINGS

BACKGROUND

This specification relates to conversion of input strings. Conventional text is associated with a particular form, for example, a particular writing system and a particular natural language. A writing system can be used to represent one or multiple languages. For example, a Latin writing system (represented using Roman characters) can be used for the natural language English as well as for the natural language Chinese, e.g., as used in Romanized Chinese (e.g., Pinyin). Similarly, multiple writing system can be used to represent the same language. For example, Hanzi and Pinyin writing systems can be used to represent Chinese. Converting an input string between forms (e.g., from one writing system to another or from one natural language to another) can involve translation or transliteration of the input string.

SUMMARY

This specification describes technologies relating to conversion of text input strings from a first form to a second form.

In internationalization and translation of text and speech, certain words are translated based on their meaning or semantics (for example, English "high" may be translated to Japanese "高い", while English "bridge" may be translated to "橋"). Other words are transliterated based on their sound or orthography, e.g., rules for using a specific writing system to write a language. For example, the English name "Highbridge" is transliterated to Japanese as "ハイブリッジ", not to the translated form "高橋". Hybrid forms include translating a portion of the input string semantically and transliterating other portions of the input string. For example, "Highbridge Park" can become the hybrid form "ハイブリッジ公園" in Japanese, where "ハイブリッジ" is a transliteration portion and "公園" is a translation portion.

This specification describes techniques for converting an input string of terms from a first form to a second form, e.g., from one natural language or writing system into another natural language or writing system. The converting can be performed, for example, using transliteration and hybrid translation techniques. Converting an input string of terms from a first form to a second form can include converting from a writing system in a first language to a writing system of a second language as well as converting between two writing systems in the same language.

In some implementations, for an input string including multiple terms, a machine transformation is performed to convert the input string from one form to an output string in another form. The machine transformation can include generating an output string that is a hybrid of transliteration and translation of terms in the input string. For example, converting an input string of terms can include using rules to determine if one or more terms are to be translated and using language specific rules to perform transliteration on other terms.

In general, one aspect of the subject matter described in this specification can be embodied in methods that include the actions of receiving input string having a plurality of terms, the input string being in a first form; transforming the input string from the first form to a second form including: applying one or more rules to the input string to identify one or more terms for translation, the one or more identified terms being fewer than the plurality of terms, translating the identified one or more terms to one or more translated terms in the second form, and transliterating the remaining terms of the plurality of terms into transliterated terms in the second form; and concatenating the translated and transliterated terms to form a hybrid output string in the second form. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

These and other embodiments can optionally include one or more of the following features. The first form and the second form are a first writing system and a second writing system respectively. The first form and the second form are a first natural language and a second natural language respectively. The input string includes a type and where applying one or more rules to the input string includes identifying one or more rules having a type that matches the type of the input string; and for rules that match the type of the input string, determining whether the input string matches a string pattern of the respective one or more matching rules. Each rule includes a number of respective rule outputs for respective output forms. A matching rule includes one or more terms of the rule pattern to be translated from the first form to the second form. Transliterating the remaining terms includes: tokenizing the string into a plurality of tokens; transliterating each token from the first form to a second form; and concatenating the transliterated tokens in the second form to form a transliterated output string in the second form.

In general, one aspect of the subject matter described in this specification can be embodied in methods that include the actions of receiving a string having a plurality of terms to be transliterated, the string being in a first form; tokenizing the string into a plurality of tokens; transliterating each token from the first form to a second form; applying one or more form specific rules to the transliterated tokens in the second form; and concatenating the transliterated tokens in the second form to form a transliterated output string in the second form. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

These and other embodiments can optionally include one or more of the following features. Tokenizing the string includes separating the string into word tokens. The first form is a first writing system and the second form is a second writing system. The first form is a first natural language and the second form is a second natural language. A form specific rule relates to a variety of phonological processes that occur at morpheme or word boundaries. Concatenation includes adding an additional character between one or more pairs of output terms based on the output form and one or more linguistic rules. Transliterating each token include using one or more finite state transducers to generate phonetic representations in the first form and the second form.

Particular embodiments of the subject matter described in this specification can be implemented so as to realize one or more of the following advantages. Accuracy of transformations are improved using hybrid of transliteration and semantic translation as compared with pure transliteration or translation. Transliteration is improved using context of other terms as compared with translating individual terms independently. Incorporating information about the entity whose name is transcribed improves transliteration accuracy. For example, knowing whether "Menlo Park" denotes a park or a city may affect the transformed output.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
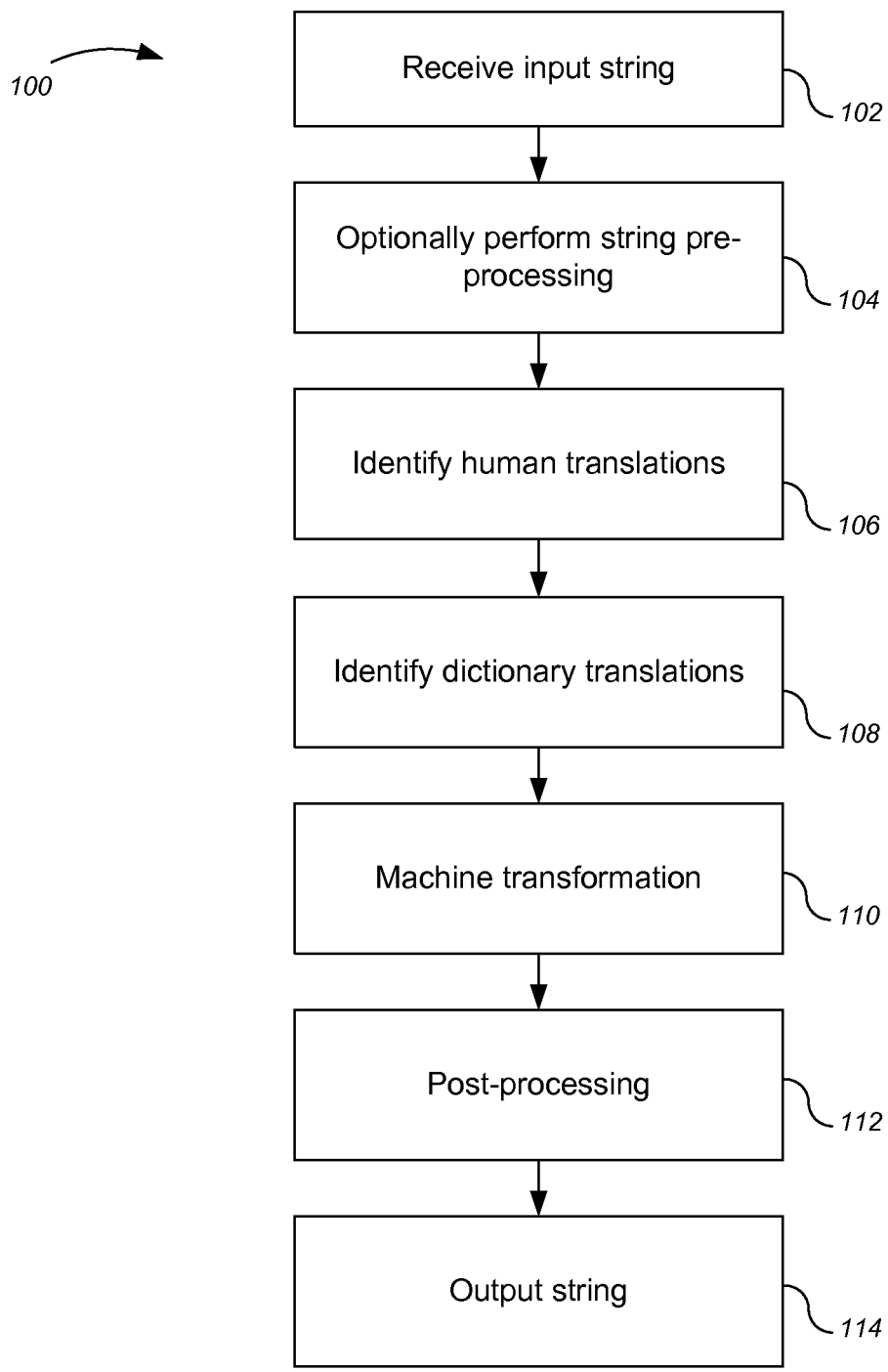
FIG. 1 is a flow diagram of an example method for converting input strings.

FIG. 1 is a flow diagram of an example method 100 for converting input strings. For convenience, the method 100 will be described with respect to a system, including one or more computing devices, that performs the method 100. In particular, the method 100 describes operations with respect to processing geographic data for presentation (e.g., in a map view), however, similar actions can be performed on other types of data.

The system receives 102 one or more input strings in a first writing system. The input strings are to be converted from a first form to a second form (e.g., from a first writing system to a second writing system). The first and second forms can represent same or different languages. In some implementations, the one or more input strings are received from a collection of geographic features (e.g., from a database of geographic features). These geographic features can include, for example, political designation (e.g., names for cities or states), tourist destinations, or parks.

Each geographic feature can be annotated or otherwise marked with information about the corresponding entity in the physical world (e.g., a feature type). The information can include type categories, for example, "city", "park", or "tourist attraction". In some implementations, typing is a simple enumeration of types without inheritance. In other implementations, typing is handled using a single-inheritance tree hierarchy where each type is a sub-type of another type, with exception of one or more root types that are not sub-type of any other type. In yet some other implementations, typing is handled using multiple-inheritance tree where a type can be a sub-type of zero, one or several other types. The features can be used to generate rules, as described in greater detail below with respect to FIG. 2.

Additionally, the type hierarchy can allow multiple type tags per feature of free-form text describing the feature type. Besides typing, features may also be marked with other information about the denoted physical entity, for example the population count of cities, or the height of buildings. This other, non-typing, information can also be used to influence the generated transliterations, for example, when applying rules only to cities of a certain size, or only to names of large buildings.

While the example of geographic features are used, other data can be processed in a similar manner, for example a business registry or other data in which outside information about particular types is known or can be derived (e.g., product names, individuals). For example, for business names can be associated with different business features that can be applied (e.g., to label "Inc" as identifying a corporation).

The system optionally performs pre-processing 104. Pre-processing can include a number of operations performed on the input strings. Pre-processing can also entail actions performed on the input strings directly, or generating databases or other collections of information (e.g., dictionaries) for later application to the input strings.

In some implementations, some preprocessing steps are part of a larger pipeline for processing geographic data for presentation. For example, for geographic data the pre-processing can include merging and/or removing duplicate features, stitching roads from neighboring data sets, synthesizing new features from the shape of existing ones, cleaning up geometric irregularities (e.g., errors in provided data such as streets with a single point location or inconsistent geometry), or injecting feature attributes.

Stitching roads from neighboring data sets refers to correcting geographic data between different regions where different data sets can be used, for example, a road crossing a boundary between a first country and a second country may not be aligned between a data set for the first country one and a data set for the second country. This preprocessing operation can be part of a pipeline for processing geographic data generally for presentation. Synthesizing features in geographic data includes, for example, synthesizing a boundary of English-speaking areas from countries and provinces, e.g., United Status plus Australia plus New Zealand Plus Canada minus Quebec. This helps define which regions require transformation of input strings and some that may not based on information in addition to countries or other geopolitical boundaries.

While described as part of a pre-processing phase, these tasks can be performed in a complex sequence, as part of later processes (e.g., during transliteration) or as separate operations depending on the type of tasks being performed. For example, human injected translations can be applied during transliteration operations described below with respect to FIG. 3. Alternatively, in some implementations, no pre-processing is performed (e.g., geographic operations to map features can be processed separately or are unnecessary for non-geographic data sets).

The system identifies 106 human-entered translations for the input strings. These are translations identified by humans for well-known terms that have irregular translations. For example, for the Swiss city whose French name is "Genève", this step might add the English name "Geneva", German "Genf", Italian "Ginevra", Slovak "eneva", Russian "Женева", etc. Likewise, for the US state whose English name is "California", this step might add the German name "Kalifornien". This allows for the addition of corresponding terms to correct input data, which reduces the likelihood of a bad conversion due to a spelling errors or using a language version of the term that is not identified by one or more rules used to process the input text. For example, the name of one particular street might have a typo, or is wrongly named, e.g., due to a data provider problem. These identified translations are entered into a database or dictionary, for example, for use in performing transliteration or translation operations described below with respect to FIGS. 2-3.

The system identifies 108 dictionary translations for one or more terms. Dictionary translations are applied on all terms in a collection of input text having the same name. For example, there are many buildings in the United States that are called "City Hall". The dictionary phrase might look up the name, and inject names such as German "Rathaus", French "Hôtel de Ville", Japanese "役所", etc. to every term carrying the matching name. Thus, a number of translations for particular features or terms are identified for use in transforming string.

The system performs a machine transformation 110 on each input string. The machine transformation transforms at least a portion of an input string in a first form to a second form. The machine transformation of an input string includes determining whether there is a portion that can be translated according to one or more rules and performing transliteration of any portion that is not translated. Machine transformation of an input string is described in greater detail below with respect to FIGS. 2-3.

The system optionally performs post-processing 112 on the converted input string. For example, post-processing can be used to blacklist terms or attributes that some earlier parts of the pipeline did not process correctly. For example, the quality of transformed output strings can vary for particular geographic regions for linguistic reasons (e.g., South Africa has many names that are a combination of English, Dutch, and German, which makes the transformation difficult). As a result, blacklisting of transformed terms, for example street names, where the data is currently unreliable can be performed. Thus, in the example of presenting map data, those terms would not be transformed for display, but instead the original input strings would be used. Similarly, Singapore has many streets in both Chinese and English so there is no need to translate those English street names to Chinese.

The system outputs 114 the converted strings in the second form. For example, converted strings can be stored (e.g., in a database or other repository) for later use. In some implementations, the converted strings are geographic labels that are retrieved when corresponding map data is requested for display. For example, the database with English language string of geographic data identifying Chinese information can be converted to Chinese strings for use in labeling a presented map of China. In another example, the converted strings can be presented to the user after being generated. In either example, one or more of the converted strings can be presented alone (e.g., a transformed documents) or with other data (e.g., map information).

Figures 2, 3:
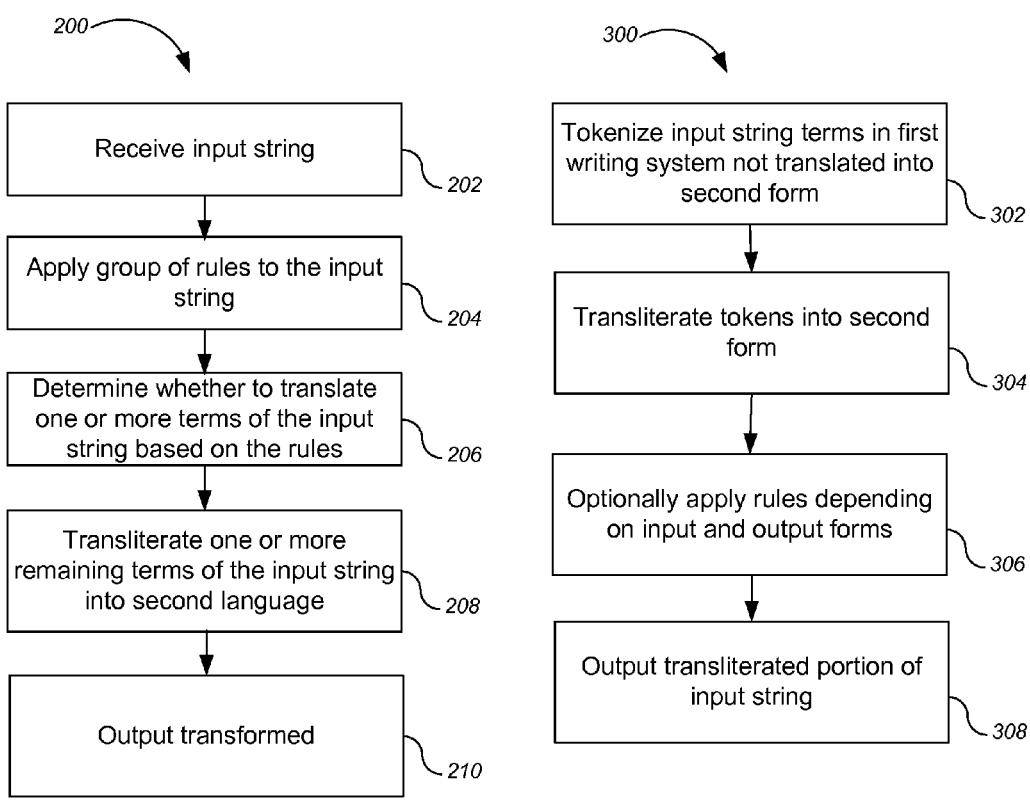
FIG. 2 is a flow diagram of an example method for machine transformation of an input string.
FIG. 3 is a flow diagram of an example method for transliterating terms of an input string.

FIG. 2 is a flow diagram of an example method 200 for machine transformation of an input string. For convenience, the method 200 will be described with respect to a system, including one or more computing devices, that performs the method 200.

The system receives 202 an input string. The input string can be received, for example, from a collection of input strings to be converted from a first form to a second form. In some implementations, the input string has undergone one or more pre-processing steps prior to being received, for example as described in FIG. 1. Alternatively, input strings are processed directly without pre-processing.

The system applies 204 a group of rules to the received input string. The rules identify particular features types and actions to perform if the feature type is matched to the input string. The system applies each rule to the input string, for example, according to a rule hierarchy. Features are matched to particular feature types based on a labeling of features in the input string. The rule can have a pattern of one or more terms that match the rule for a given feature type. If the input string matches the input pattern, then the rule matches. In some implementations, for each rule defined for a given language or writing system there are one or more output patterns in respective languages or writing systems. If an input string matches the input pattern, the system generates one or more output terms according to the respective output pattern defined by the rule.

For example, provided below are three example rule structures for transforming English ("en") names of geographic features to Japanese ("ja"), Korean ("ko"), Kyrgyz ("ky"), Russian ("ru"), Simplified Chinese ("zh-Hans"), and Traditional Chinese ("zh-Hant"). These example rules are simplified for clarity.

select <feature_type: "TYPE_PARK">
  name <text:"(.+) Park" language:"en">
  out <text:"$ {1} 公園" language:"ja">
  out <text:"$ {1} 공원" language:"ko">
  out <text:"$ {1} парλы" language:"ky">
  out <text:"Парλ $ {1}" language:"ru">
  out <text:"$ {1} 公园" language:"zh-Hans">
  out <text:"$ {1} 公園" language:"zh-Hant">
select <feature_type: "TYPE_TOURIST_DESTINATION">
  name <text:"(.+) Zoo" language:"en">
  out <text:"$ {1} 動物園" language:"a">
  out <text:"$ {1} 동물원" language:"ko">
  out <text:"$ {1} зоопаркы" language:"ky">
  out <text:"Зоопарλ $ {1}" language:"ru">
  out <text:"$ {1} 动物园" language:"zh-Hans">
  out <text:"$ {1} 動物園" language:"zh-Hant">
select <feature_type: "TYPE_POLITICAL">
  name <text:"(.+)" language:"en">
  out <text:"${1}" language: "ja">
  out <text:"$ {1}" language:"ru">
  out <text:"$ {1}" language:"ko">
  out <text:"$ {1}" language:"ky">
  out <text:"$ {1}" language:"zh-Hans">
  out <text:"$ {1}" language:"zh-Hant">

Thus, for example, the rule associated with the feature type "park" has an English input pattern of "(.+) Park" so that an input text string of the feature type park having some wildcard text followed by "park" matches the rule. For example, the input string Lafayette Park, referring to a park in San Francisco, Calif., matches the input pattern. Corresponding output patterns are provided in multiple languages.

In particular, for a given input string, again "Lafayette Park", the system will walk all of the rules seeking a match. In the example of "Lafayette Park," the first rule matches because the feature "Park" in the input string is labeled as having the feature type of "TYPE_PARK". The rules are arranged in an ontology of feature types, so that sub-types of "TYPE_PARK" (not shown) (e.g., "TYPE_MUNICIPAL_PARK") would also match. Additionally, the first rule matches because the input string "Lafayette Park" matches the input pattern "(.+) Park".

The system determines 206 whether to translate one or more terms of the input string based on the rules. In particular, if the input string has matched a particular feature and rule, the system generates one or more output strings. The output pattern can include a translated term or terms for one or more languages. As shown in the example rules the "out" clauses contains, for output languages, a pattern that specifies how to generate the output. In the case of "Lafayette Park", the rule identifies an output pattern in multiple languages, each translating "Park" into a respective language. For example, in Japanese the output pattern for the rule is "out <text: "$ {1}公園" language: "ja">", where $ {1} is "Lafayette" and "公園" is the translation of the term "park" in Japanese. Thus, a portion of the string is translated into a second form while a portion of the string remains in a first form.

In contrast, an input string "Menlo Park" referring to a city in California and having the feature type "TYPE_CITY" will not match the first rule of the above example rules. This is because according to the type system in use, the feature type "TYPE_CITY" is not considered a sub-type of "TYPE_PARK." Because the first rule did not match, the system will try the second rule for feature type "TYPE_Tourist_Destination," again without success.

However, the third rule matches because "TYPE_CITY" is a sub-type of "TYPE_POLITICAL." However, in this case the there is no portion of the string that is translated since the output pattern for a string matching the rule does not include a translation and the entire output $ {1} is "Menlo Park."

The system transliterates 208 the one or more remaining terms in the input string. In particular, for an input string having one or more terms, any terms that were not translated according to a matching rule are transliterated. Transliteration maps the terms from a first form to a second form. The second form can be for the same language or for a different language or for the same writing system or a different writing system. Particular transliteration techniques are described in greater detail below with respect to FIG. 3.

The system outputs 210 a transformed string. The transformed string includes a concatenation of any transliterated terms and any translated terms from the rule application. In some implementations, multiple transformed strings are output for respective languages or writing systems (e.g., "Park" translated into Japanese: "公園", Korean: "공원" and Russian: "Парк". In some other implementations, a particular output language or writing system is specified for the input string (e.g., English to Japanese).

In the above examples, the input string "Lafayette Park" matched a rule such that the applied rule resulted in "Lafayette 公園" where "公園" is a translation of "Park" in Japanese. The term "Lafayette" is then transliterated into the target writing system, in this case Japanese. In this example, the transliteration returns "ラファイエット". This is concatenated with the translation for "Park," resulting in the hybrid form of "ラファイエット公園".

Similarly, in the second example of "Menlo Park" no terms were translated so the entire input string is transliterated. For a transliteration into Japanese, the resulting output is "メンロー・パーク". In particular, note that due to the use of the feature types, the city "Menlo Park" is transliterated literally, while the park "Lafayette Park" is partially transliterated and partially translated.

As another example, the input string "Geneva city hall" identifies a translation for "city hall" based on a rule. The system then performs transliteration on "Geneva". "Geneva" can appear in a database of human-entered translations (e.g., as described above with respect to step 106 in FIG. 1, the system uses the translation of "Geneva" as the transliterated output. The transformed output would then be the translation of "Geneva" concatenated with the translation of "city hall."

A similar process can be used for other types of data. For example, a business name can be processed according to specific business rules. Thus, for the business name "Foo Bar Inc.," a rule may identify "Inc" with a translation of "incorporated" into another form. This translation can be concatenated with a transliteration of "Foo Bar" resulting in a hybrid transformed output string.

FIG. 3 is a flow diagram of an example method 300 for transliterating terms of an input string. For convenience, the method 300 will be described with respect to a system, including one or more computing devices, that performs the method 300.

The system tokenizes 302 input string terms in the first form not translated into the second form. For example, the system tokenizes the input string terms by splitting the string into separate words. In English, for example, this is done by using spaces as split points. In other languages, e.g., Chinese, Japanese, and Korean, depending on the writing system, the lack of spaces between words requires other tokenization techniques for these languages. In the above example of "Menlo Park" the tokens become ["Menlo", "Park"].

The system transliterates 304 each token into the second form (e.g., second language or writing system). In particular each token is transliterated separately. In the above example, the tokens [Menlo, Park] are transliterated separately into [メンロー, パーク]. Different transliteration techniques can be used to transliterate individual tokens or words. Example transliteration techniques are described in detail below.

Optionally, depending on the combinations of input and output forms (e.g., particular input and output languages), the system applies 306 additional rules to the transliterated tokens. Specifically, these additional rules address particular linguistic phenomena that are specific to the input and output forms. For example, one linguistic phenomenon is referred to as external Sandhi, or, specifically for French, this is referred to as "French Liason." This phenomenon relates to how particular words are treated depending on their context with one or more other words. In particular, this relates to a variety of phonological processes that occur at morpheme or word boundaries.

For example, consider the French name "Maison des abricots" (house of apricots). The issue is that the French word "des" (English: of) is pronounced differently depending on the word that follows. This pronunciation difference becomes visible when transliterating French to certain other languages. If the following word begins with a consonant, French "des" gets pronounced as [de], i.e. the word-final "s" is not pronounced. However, if the following word begins with a vowel, the French pronunciation of "des" contains a voiced, audible [z] sound, as in [dez]. As an added complication, a correct Japanese transliteration of French requires that the [z] sound does not get attached to the transliteration of "des", but instead is pre-pended to the transliteration of the subsequent word. Thus, when transliterating ["Maison", "des", "abricots"], the application of the language specific transliteration rule changes ["メゾン", "デズ", "アブリコー"] to ["メゾン", "デ", "ザブリコー"], in other words: (["mezō", "dezu", "aburikō"] to ["mezō", "de", "zaburikō"]).

In order to apply these additional rules both the input and output tokens are used. Additionally, for Sandhi rules, a dictionary of Sandhi-triggering words can be used to generate the rules. For example, when transliterating French to Japanese, only some but not all French words ending in "-s" trigger Liaison to an extent that it would manifest in the Japanese transliteration.

The system outputs 308 the transliterated output string. If multiple tokens were transliterated, the final sequence of terms are concatenated to form the transliterated output with any changes in terms or term order based on additional rule application.

If a portion was translated, this transliterated portion is combined with the translated portion to generated the transformed output string described above. In some implementations, concatenation includes adding spaces between the transliterated terms (e.g., in concatenating English language transliterations). For example, the translated tokens ["Menlo", "Park"] are concatenated by adding spaces between each term to provide "Menlo Park". In some other implementations, language specific hyphenation rules are applied when concatenating. For example, in German there are spelling rules that require hyphenation in particular types of strings, e.g., "Anna-Karenina-Park." In yet some other implementations, concatenation includes adding other features between transliterated tokens. For example, Katakana middle dots can be added between Japanese words. Thus, for the input string "Menlo Park" the Japanese transliterated tokens [メンロー, パーク] become output string "メンロー・パーク". The rules can be more complex then simply inserting middle dots instead of spaces. For example, inserting Japanese Katakana middle dot characters only occurs if both sides of the insertion point are actually in one of the Japanese Kana (Katakana or Hiragana) scripts. Thus, having transformed "Menlo Park Bridge" to ["メンロー", "パーク", "橋"], the concatenation will produce "メンロー・パーク橋". A middle dot is inserted between メンロー ("Menlo") and パーク ("Park"), since both strings are in the Katakana writing system. However, no middle dot is inserted between パーク ("Park") and 橋 ("bridge"), since only the former is written in Katakana while the latter is written in the Japanese Kanji writing system.

Different techniques can be used to transliterate individual tokens (e.g., individual words). In particular, during the transliteration, each token is checked against an exception dictionary. The exception dictionary is used to handle words whose pronunciation, and correspondingly, the transliteration to other languages, is irregular. The exception dictionary can include different types of data.

In some implementations, the exception dictionary is populated based on log analysis (e.g., search logs, map logs) is used to identify what strings are frequently displayed to users. For example, it is possible to identify specific parts of the world that users of a mapping service viewed, and count the terms presented on those maps. The counts are aggregated over a specified time period (e.g., several months) and across all users. The results are split by the origin of the user request. Thus, particular strings in different language (e.g., French, English, German, Italian) are shown frequently to users in different regions e.g., Japan, Russia, China, Korea. Depending on the irregularity of the pronunciation of the source language, human evaluators (e.g., having particular language skills, for example, language teachers) manually enter the transliterations for the top 2000 to 20.000 words. Therefore, the top-N most frequently shown words have a high confidence of being correct. These transliterations are added to the exception dictionary.

In some other implementations, the exception dictionary is populated using heuristics to identify particularly irregular strings. For example, to identify strings in names within Great Britain that are likely to be Gaelic instead of English. These Gaelic words are then transliterated using a different process from the English terms to another language (e.g., Japanese). These transliterations are then added to the exception dictionary.

If the token is not found in the exception dictionary, a particular transliteration technique is selected. For example, a particular transliteration technique can be selected based on the source and target languages or writing systems. Thus, for example, one transliteration technique can be used when transforming Spanish language input to Japanese language output while another transliteration technique can be used when transforming English language input to Japanese language output. Various transliteration techniques can be used. Example transliteration techniques include, but are not limited to, simple transliteration based on context-sensitive rewrite rules, or complex transliteration based on text-to-speech technology.

Simple transliteration based on context-sensitive rewrite rules are used, for example, to transliterate input languages having a specified degree of regular punctuation (e.g., Spanish or Czech). A rewrite rule engine can be received for use in transliterating terms according to a particular library. The transliteration library is used to transform letters from one writing system to another without translating the underlying words. For example, the English input "bat" can be transliterated into Greek as "βατ".

In some implementations, an open-source transliteration library is used. The library includes rules that define how characters are transliterated from one writing system to another writing system. Custom transformation rules can be generated for the library being used according to a specific transformation rule syntax.

In some implementations, the text is transformed in multiple steps: from the input language to a phonemic representation of the input language (e.g., the International Phonetic Alphabet (IPA) or X-SAMPA notation); from the phonemic representation of the input language to the phonemic representation of the output language; from the phonemic representation of the output language to the written form of the output language.

The library includes a collection of rules for transliterating particular types of text. For example, in some cases there is a one-to-one relationship between letters in both Greek and Latin. The rules map between a source string and a target string. The following shows this relationship: π < > p. The rule states that when you transliterate from Greek to Latin, convert π to p and when you transliterate from Latin to Greek, convert p to π. More generally, the syntax is: string1< > string2. Rules can be more complex, e.g., rules can be based on context. For example, in Greek the rule transforms a "γ" to an "n" if it is before any of the following characters: γ, κ, ξ, or χ. Otherwise the rule transforms it to a "g". Similarly, in another example, a Greek sigma is written as "ς" if it is at the end of a word (but not completely separate) and as "σ" otherwise. When transforming characters from Greek to Latin, this is not a problem. However, it is a problem when transforming the character back to Greek from Latin, in particular, the rule defines when to convert to an "s" depending on the context of the string being transliterated.

For example, when performing transliteration to transform a Czech input string to a Korean input string, the following chain can be used: Czech→Phonemic Czech using IPA symbols→Korean in the Latin script→Korean in the Korean script. In particular, this provides the following transformations hořký→ɦ orki: →holeusyuki→ 호르슈키].

The steps are separable so that portions of the rules can be used independently and chained with other rules for re-use across multiple language pairs. For example, the rules for transliterating Czech to Japanese work on the exact same "Phonemic Czech using IPA symbols" like the Czech-to-Korean rules. Thus, the transformation from Czech to "Phonemic Czech using IPA symbols" can be used both when generating Korean and when generating Japanese output. As an illustration, below are rules for transforming the Czech letter n into either [n] or [n] depending on context:

{n} [gkqx]→ ŋ; # before one of [g k q x], the Czech grapheme n gets pronounced as velar nasal ŋ sound {n}→n; # in other contexts, the Czech grapheme n gets pronounced as n sound.

And, also an illustration, these are the rules for transforming the Czech letter ř (which gets pronounced, in IPA notation, as [r̝]) into four different Korean-Latin strings, depending on the context:

{r̝} $end→leusi; # ř at the end of a word, e.g., kouř→코우르ㅅ

{r̝} $vowel→leuj; # ř before a vowel

{r̝} k→leusyu; # ř before a k sound

{r̝}→leuju; # ř in any other context.

When performing transliteration of individual terms, the appropriate library is used to apply specific rules based on the input and output forms. The transliterated terms can then be further processed based as described above to generate a final output string that is a conversion from an input string in a first form to an output string in a second form.

For input languages with a large amount of irregular pronunciation, in particular English, a more complex system that uses text-to-speech technology can be used. Specifically, a wide class of models that are trained offline based on examples can be used to transform input words into output words or into intermediate forms. In some implementations, a system uses finite-state transducers as the class of models. In one example, a model can be trained directly on examples of input words and their corresponding transliterations. At runtime, an input word is transduced by the trained model into a multitude of possible output forms. The system derives a single best (or alternatively n-best) output form based on a numeric weighting assigned by the finite-state transducer or other model.

In another example, the overall transduction can include multiple steps: The input form is first transduced into an intermediate form; zero or more intermediate transductions can be performed; and the output transliteration is derived from one or more of the intermediate forms, optionally in combination with the input word. In some implementations, phonetic representations are used as the intermediate forms. In particular, an input word is first transduced into its phonetic representation in the source language. This phonetic representation is then transduced into a phonetic representation in the target language. The phonetic representation in the target language is then further transformed into an orthographic form in the target language. Alternatively, an input word can be transformed into a phonetic or orthographic representation in the target language. In some implementations, the system performs transliteration using phonetic representations for both the source and target language that are computed with the help of finite-state transducers.

Figure 4:
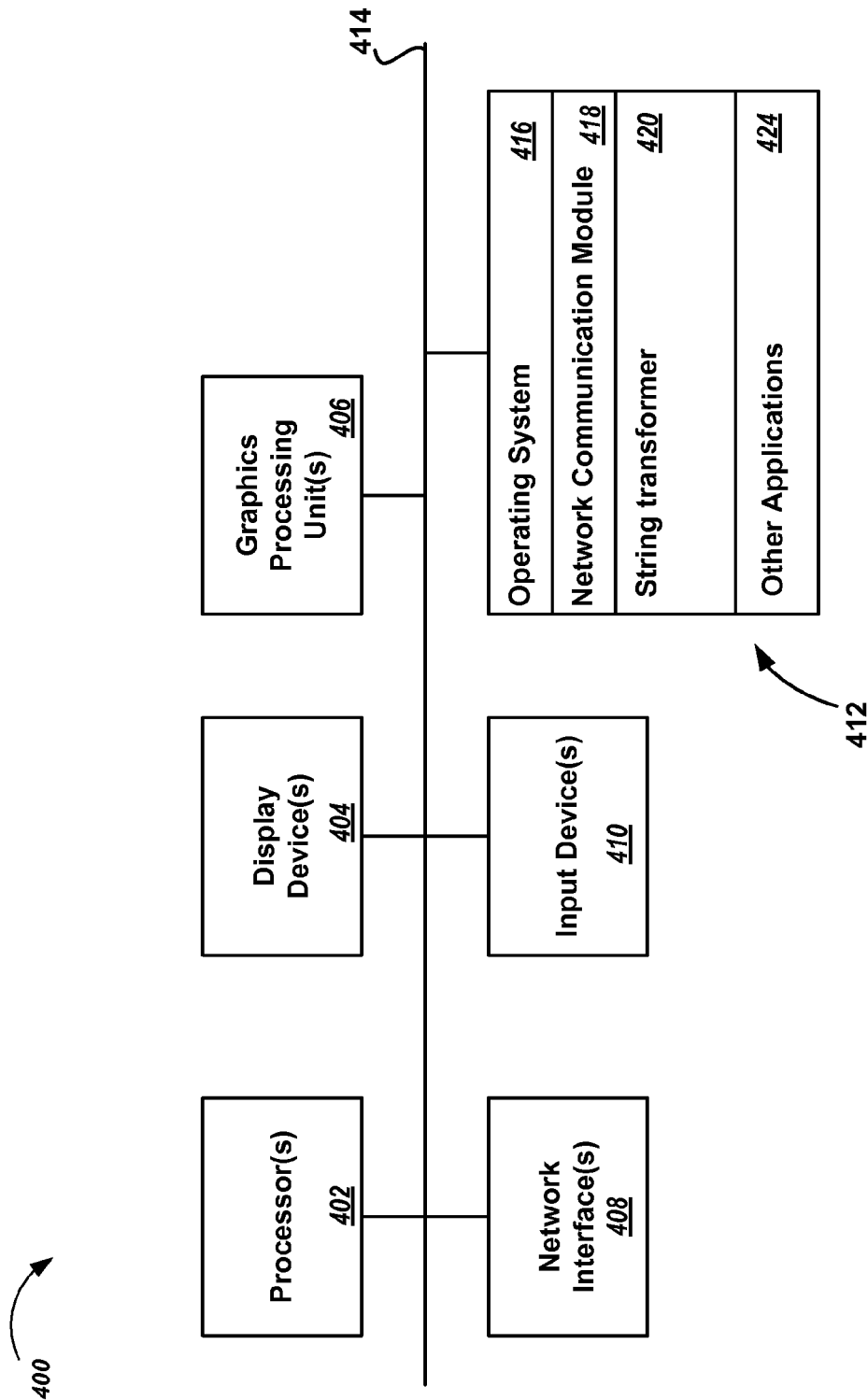
FIG. 4 is an example system architecture.

FIG. 4 is an example system architecture 400. The system architecture 400 is capable of performing operations for transforming input strings from a first form to a second form. The system architecture 400 includes one or more processors 402 (e.g., IBM PowerPC, Intel Pentium 4, etc.), one or more optional display devices 404 (e.g., CRT, LCD), graphics processing units 406 (e.g., NVIDIA GeForce, etc.), a network interface 408 (e.g., Ethernet, FireWire, USB, etc.), optional input devices 410 (e.g., keyboard, mouse, etc.), and one or more computer-readable mediums 412. These components exchange communications and data using one or more buses 414 (e.g., EISA, PCI, PCI Express, etc.).

The term "computer-readable medium" refers to any medium that participates in providing instructions to a processor 402 for execution. The computer-readable medium 412 further includes an operating system 416 (e.g., Mac OS®, Windows®, Linux, etc.), a network communication module 418, a string transformer 420, and other applications 424.

The operating system 416 can be multi-user, multiprocessing, multitasking, multithreading, real-time and the like. The operating system 416 performs basic tasks, including but not limited to: recognizing input from input devices 410; sending output to display devices 404; keeping track of files and directories on computer-readable mediums 412 (e.g., memory or a storage device); controlling peripheral devices (e.g., disk drives, printers, etc.); and managing traffic on the one or more buses 414. The network communications module 418 includes various components for establishing and maintaining network connections (e.g., software for implementing communication protocols, such as TCP/IP, HTTP, Ethernet, etc.).

The string transformer 420 provides various software components for performing the various functions for transforming input strings from a first form to a second form as described with respect to FIGS. 1-3.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, the method comprising:
   receiving, with one or more processors at a server, an input string having a plurality of terms, the input string being in a first form, wherein a given sequence of the plurality of terms refers to a geographic feature, wherein the given sequence is annotated with a geographic-feature type selected from a plurality of geographic-feature types each indicating a characteristic of an entity in the physical world corresponding to the geographic feature, and wherein the given sequence is stored in an annotated format with the geographic-feature type in a database of geographic labels prior to receiving the input string;
   transforming, with one or more processors, the input string from the first form to a second form, the transforming including:
     applying one or more rules to the input string to identify one or more terms for translation, the one or more identified terms being fewer than the plurality of terms, wherein at least some of the rules are applied in response to a match between a feature type of the respective rule and the geographic-feature type with which the given sequence is annotated to indicate the characteristic of the corresponding entity in the physical world,
     translating the identified one or more terms to one or more translated terms in the second form, and
     transliterating at least some of the remaining terms of the plurality of terms into transliterated terms in the second form, including selecting one or more transliteration rules for application in accordance with the indicated characteristic of the entity, wherein when the given sequence of the plurality of terms is annotated with a first geographic-feature type of the plurality of geographic-feature types, a first rule of the one or more rules identifies a specific term in the input string for translation in response to a match between a first feature type of the first rule and the first geographic-feature type, and when the given sequence of the plurality of terms is annotated with a second geographic-feature type of the plurality of geographic-feature types, a second rule of the one or more rules identifies the same specific term in the input string for transliteration in response to a match between a second feature type of the second rule and the second geographic-feature type, wherein the specific term is translated or transliterated to a term having the same grammatical form as the specific term; the method further comprising:
   concatenating, with one or more processors, at least the translated and transliterated terms to form a hybrid output string in the second form; and
   storing the hybrid output string in the database of geographic labels; and
   when a map of a geographic region including the entity is requested for display: (i) retrieving the hybrid output string from the database and (ii) providing, via a network interface, the hybrid output string along with map data for presenting the map with the hybrid output string at a client device.

2. The method of claim 1, wherein the first form and the second form are a first writing system and a second writing system respectively.

3. The method of claim 1, wherein the first form and the second form are a first natural language and a second natural language respectively.

4. The method of claim 1, wherein applying one or more rules to the input string comprises:
   for rules that match the geographic-feature type of the given sequence, determining whether the input string matches a string pattern of the respective one or more matching rules.

5. The method of claim 1, wherein each rule includes a number of respective rule outputs for respective output forms, the respective rule outputs including translated forms of terms identified by the respective rules.

6. The method of claim 1, wherein a matching rule among the one or more rules identifies a first portion of the given sequence to be translated and a second portion of the given sequence to be transliterated.

7. The method of claim 1, wherein transliterating the remaining terms includes:
   tokenizing the string into a plurality of tokens;
   transliterating each token from the first form to a second form; and
   concatenating at least the transliterated tokens in the second form to form a transliterated output string in the second form.

8. A system comprising:
   one or more computers operable to interact to perform operations comprising:
     receiving an input string having a plurality of terms, the input string being in a first form, wherein a given sequence of the plurality of terms refers to a geographic feature, wherein the given sequence is annotated with a geographic-feature type selected from a plurality of geographic-feature types each indicating a characteristic of an entity in the physical world corresponding to the geographic feature, and wherein the given sequence is stored in an annotated format with the geographic-feature type in a database of geographic labels prior to receiving the input string;

transforming the input string from the first form to a second form, the transforming including:
   applying one or more rules to the input string to identify one or more terms for translation, the one or more identified terms being fewer than the plurality of terms, wherein at least some of the rules are applied in response to a match between a feature type of the respective rule and the geographic-feature type with which the given sequence is annotated to indicate the characteristic of the corresponding entity in the physical world,
   translating the identified one or more terms to one or more translated terms in the second form, and
   transliterating at least some of the remaining terms of the plurality of terms into transliterated terms in the second form, including selecting one or more transliteration rules for application in accordance with the indicated characteristic of the entity, wherein when the given sequence of the plurality of terms is annotated with a first geographic-feature type of the plurality of geographic-feature, a first rule of the one or more rules identifies a specific term in the input string for translation in response to a match between a first feature type of the first rule and the first geographic-feature type, and when the given sequence of the plurality of terms is annotated with a second geographic-feature type of the plurality of geographic-feature types, a second rule of the one or more rules identifies the same specific term in the input string for transliteration in response to a match between a second feature type of the second rule and the second geographic-feature type, wherein the specific term is translated or transliterated to a term having the same grammatical form as the specific term;
   concatenating at least the translated and transliterated terms to form a hybrid output string in the second form; and
   storing the hybrid output string in the database of geographic labels; and
   when map data for a geographic region including the entity is requested for display: (i) retrieving the hybrid output string from the database and (ii) providing, via a network interface, the hybrid output string along with the requested map data for display at a client device.

9. The system of claim 8, wherein the first form and the second form are a first writing system and a second writing system respectively.

10. The system of claim 8, wherein the first form and the second form are a first natural language and a second natural language respectively.

11. The system of claim 8, wherein applying one or more rules to the input string comprises:
   for rules that match the geographic-feature type of the given sequence, determining whether the input string matches a string pattern of the respective one or more matching rules.

12. The system of claim 8, wherein each rule includes a number of respective rule outputs for respective output forms, the respective rule outputs including translated forms of terms identified by the respective rules.

13. The system of claim 8, wherein a matching rule among the one or more rules identifies a first portion of the given sequence to be translated and a second portion of the given sequence to be transliterated.

14. The system of claim 8, wherein transliterating the remaining terms includes:
   tokenizing the string into a plurality of tokens;
   transliterating each token from the first form to a second form; and
   concatenating at least the transliterated tokens in the second form to form a transliterated output string in the second form.

15. The method of claim 1, wherein:
   the geographic-feature type comprises a given type of geographic political region;
   applying one or more rules to the input string comprises:
      determining that the given type of geographic political region corresponds to a hierarchy of rules relating to geographic political regions;
      determining that the given type of geographic political region corresponds to a sub-type of geographic political regions within the hierarchy of rules; and
      determining which parts of the given sequence to translate and which parts of the given sequence to transliterate based on a rule associated with the sub-type of geographic political regions.

16. The method of claim 1, wherein transliterating at least some of the remaining terms of the plurality of terms comprises:
   transliterating at least some of the remaining terms into an intermediate phonetic representation; and
   transliterating the intermediate phonetic representation into the second form.

17. The method of claim 1, wherein transliterating at least some of the remaining terms of the plurality of terms comprises:
   tokenizing the remaining terms to produce tokens;
   transliterating a given one of the tokens based on a transliteration rule, wherein the transliteration rule transliterates the given one of the tokens based on an at least part of an adjacent token.

18. The system of claim 8, wherein transliterating at least some of the remaining terms of the plurality of terms comprises:
   transliterating at least some of the remaining terms into an intermediate phonetic representation; and
   transliterating the intermediate phonetic representation into the second form.

19. The system of claim 8, wherein transliterating at least some of the remaining terms of the plurality of terms comprises:
   tokenizing the remaining terms to produce tokens;
   transliterating a given one of the tokens based on a transliteration rule, wherein the transliteration rule transliterates the given one of the tokens based on an at least part of an adjacent token.

20. The method of claim 1, wherein transliterating at least some of the remaining terms of the plurality of terms into transliterated terms in the second form includes:
   in response to determining that the indicated characteristic is a population count of a city, wherein the city is the entity in the physical world, selecting a certain transliteration rule when the city is of a certain size, and not selecting the transliteration rule when the city is less than the certain size.

21. The method of claim 1, wherein transliterating at least some of the remaining terms of the plurality of terms into transliterated terms in the second form includes:
   in response to determining that the indicated characteristic is a height a building, wherein the building is the entity in the physical world, selecting a certain transliteration rule when the building is a certain height, and not selecting the transliteration rule when the building is less than the certain height.

22. The method of claim 1, wherein transliterating at least some of the remaining terms of the plurality of terms into transliterated terms in the second form includes transliterating a term in the input string based on context of other terms in the input string and based on the first and second forms.

* * * * *